(12) United States Patent
Rotole et al.

(10) Patent No.: US 11,587,218 B2
(45) Date of Patent: Feb. 21, 2023

(54) BALE SHAPE MONITORING SYSTEM

(71) Applicant: DEERE & COMPANY, Moline, IL (US)

(72) Inventors: David V. Rotole, Bloomfield, IA (US); Devin M. Franzen, Fort Atkinson, IA (US)

(73) Assignee: DEERE & COMPANY, Moline, IL (US)

( * ) Notice: Subject to any disclaimer, the term of this patent is extended or adjusted under 35 U.S.C. 154(b) by 324 days.

(21) Appl. No.: 16/879,185

(22) Filed: May 20, 2020

(65) Prior Publication Data

US 2021/0366100 A1 Nov. 25, 2021

(51) Int. Cl.
*G06T 7/00* (2017.01)
*A01F 15/07* (2006.01)
*G01B 11/24* (2006.01)
*G01N 21/88* (2006.01)
*G01F 22/00* (2006.01)
*G01N 21/952* (2006.01)
*A01F 15/08* (2006.01)
*G01N 21/84* (2006.01)

(52) U.S. Cl.
CPC .......... *G06T 7/0004* (2013.01); *A01F 15/071* (2013.01); *A01F 15/0715* (2013.01); *G01B 11/24* (2013.01); *G01F 22/00* (2013.01); *G01N 21/8851* (2013.01); *G01N 21/952* (2013.01); *G06T 7/001* (2013.01); *A01F 15/0833* (2013.01); *A01F 2015/076* (2013.01); *G01N 2021/8466* (2013.01); *G01N 2021/8887* (2013.01); *G06T 2207/10012* (2013.01); *G06T 2207/10028* (2013.01); *G06T 2207/30128* (2013.01)

(58) Field of Classification Search
CPC .................. G06T 7/0004; G06T 7/001; G06T 2207/10012; G06T 2207/10028; G06T 207/30128; A01F 15/071; A01F 15/0715; A01F 15/0833; A01F 2015/076; G01B 11/24; G01F 22/00; G01N 21/8851; G01N 21/952; G01N 2021/8466; G01N 2021/8887

See application file for complete search history.

(56) References Cited

U.S. PATENT DOCUMENTS

| 9,560,808 | B2* | 2/2017 | Foster | A01F 15/08 |
| 9,996,745 | B2* | 6/2018 | Deevi | B07C 5/366 |
| 10,005,587 | B2* | 6/2018 | Whitman | G06K 7/10316 |

(Continued)

FOREIGN PATENT DOCUMENTS

EP 2656726 A1 10/2013

*Primary Examiner* — Gregory M Desire

(57) ABSTRACT

A bale monitoring system includes an imaging device that is operable to capture a stereoscopic image of a bale. A computing compares the stereoscopic image of the bale to a three-dimensional standard to identify a deviation of the bale from the three-dimensional standard. The computing device may then assign the bale a shape quality score based on the deviation of the bale from the three-dimensional standard. The shape quality score may indicate a magnitude of the deviation of the bale from the three-dimensional standard. Additionally, the stereoscopic image may be analyzed to identify characteristics of the bale, such as a broken wrap material or an improperly formed bale.

16 Claims, 3 Drawing Sheets

(56) References Cited

U.S. PATENT DOCUMENTS

| | | | |
|---|---|---|---|
| 11,074,684 B2* | 7/2021 | Onishi | G06T 5/50 |
| 11,435,188 B2* | 9/2022 | Boydens | G06Q 10/04 |
| 2014/0324272 A1* | 10/2014 | Madsen | A01B 69/001 |
| | | | 701/28 |
| 2017/0354118 A1* | 12/2017 | Garner | A01K 1/0152 |
| 2019/0294914 A1* | 9/2019 | Fevold | G06V 10/446 |
| 2020/0281122 A1* | 9/2020 | Mor | A01D 90/10 |

\* cited by examiner

BALE SHAPE MONITORING SYSTEM

TECHNICAL FIELD

The disclosure generally relates to a bale monitoring system for a baler implement.

BACKGROUND

A baler implement gathers crop material and forms the crop material within a baling chamber into a defined shape. The defined shape may include, but is not limited to, a cylindrical shape, e.g., a round bale, or a rectangular parallelepiped, e.g., a large square bale. A wrap system may then wrap a wrap material around the circumference of the bale to retain the bale in its formed shape. The wrap material may include, but is not limited to, twine, a mesh net wrap material, or a solid wrap material. Once wrapped with the wrap material, the bale may be discharged from the baling chamber, often onto a ground surface.

Upon being discharged from the baling chamber, the shape of the bale may differ from an intended or desired final bale shape. For example, if the wrap material is broken or torn, the discharged bale may include a bulge that extends outward from the defined shape. In another example, if an operating parameter of the baler implement is improperly set, then the baler implement may fail to properly form the crop material into the desired bale shape.

SUMMARY

A bale monitoring system for characterizing and assessing a quality of a bale is provided. The bale monitoring system includes an imaging device that is operable to capture a stereoscopic image of the bale. A computing device is disposed in communication with the imaging device for receiving the stereoscopic image of the bale. The computing device includes a processor and a memory having a shape identification algorithm stored thereon. The processor is operable to execute the shape identification algorithm to compare the stereoscopic image of the bale to a three-dimensional standard to identify a deviation of the bale from the three-dimensional standard. The computing device may then assign the bale a shape quality score based on the comparison of the stereoscopic image of the bale to the three-dimensional standard. The shape quality score indicates a magnitude of the deviation of the bale from the three-dimensional standard.

In one aspect of the disclosure, the imaging device includes a stereo camera having at least two separate lenses. Each respective lens has a respective image sensor. The separate lenses are spaced from each other, such that the sensed images from each are offset from each other, thereby providing the binocular images that enable the imaging device to generate the stereoscopic image simulating three dimensional human vision.

In one aspect of the disclosure, the imaging device may be positioned to capture the stereoscopic image of the bale outside of a baling chamber of a baler implement. In another aspect of the disclosure, the imaging device may be positioned to capture the stereoscopic image of the bale inside the baling chamber of the baler implement.

In one aspect of the disclosure, the processor is operable to execute the shape identification algorithm to determine an adjustment for the baler implement based on the shape quality score. The adjustment may control a position and/or operation of one or more operating parameters of the baler implement, such as but not limited to, a bale diameter, side panel tension, a net wrap system, crop material pick-up, a pre-cutter system, etc.

In one aspect of the disclosure, the processor is operable to execute the shape identification algorithm to communicate the adjustment to the baler implement so that the bale implement may control one or more systems thereof to improve bale quality, i.e., to improve the shape quality score of future bales.

In one aspect of the disclosure, the processor is operable to execute the shape identification algorithm to generate a point cloud representing the stereoscopic image and save the point cloud in the memory. The point cloud may be combined with other point cloud data for a respective bale to provide additional three-dimensional data. Additionally, the computing device may use the point cloud data for other calculations.

In one aspect of the disclosure, the processor is operable to execute the shape identification algorithm to calculate a volume of the bale from the stereoscopic image of the bale. The volume may be used in combination with a weight of the bale to calculate a bale density.

In one aspect of the disclosure, the processor is operable to execute the shape identification algorithm to determine if the bale wrap disposed around the circumference of the bale is broken or is unbroken. The computing device may make this determination based on the comparison of the stereoscopic image of the bale to the three-dimensional standard. For example, if the stereoscopic image of the bale differs significantly from the three-dimensional standard in certain characteristics, such as by bulging outward, then the computing device may determine that the wrap material is broken, thereby allowing the crop material to bulge outward.

In one aspect of the disclosure, the processor is operable to execute the shape identification algorithm to communicate the shape quality score to a bale management algorithm. The bale management algorithm may be located on the computing device or may be remote from the computing device. The bale management algorithm may track other features associated with the bale in addition to the shape quality score. For example, the bale management algorithm may track a location of each respective bale as well. As such, in one aspect of the disclosure, the processor is operable to execute the shape identification algorithm to associate a location of the bale with the stereoscopic image of the bale, and communicate the location of the bale to the bale management algorithm and/or store the location data in the memory.

In one aspect of the disclosure, the imaging device is mounted on a baler implement. For example, the imaging device may be mounted on an exterior of the baler implement, outside of a baling chamber of the baler implement. In another aspect of the disclosure, the imaging device may be mounted inside of the baling chamber. Furthermore, it should be appreciated that a first imaging device may be locating inside the baling chamber, and a second imaging device may be located outside the baling chamber.

A baler implement is also provided. The baler implement includes a baling chamber operable to form crop material into a bale having a defined shape. A wrap system is operable to wrap the bale with a wrap material to secure the crop material in the defined shape. An imaging device is operable to capture a stereoscopic image of the bale. A computing device is disposed in communication with the imaging device for receiving the stereoscopic image of the bale. The computing device includes a processor and a memory having shape identification algorithm stored thereon. The processor is operable to execute the shape identification algorithm to compare the stereoscopic image of the bale to a three-dimensional standard to identify a deviation of the bale from the three-dimensional standard indicating the wrap material is broken. The shape identification algorithm may activate an alert system when the deviation indicates that the wrap material is broken.

In one aspect of the disclosure, the processor is operable to execute the shape identification algorithm to assign the bale a shape quality score based on the comparison of the stereoscopic image of the bale to the three-dimensional standard. The shape quality score indicates a magnitude of the deviation of the bale from the three-dimensional standard, and may be used by the shape identification algorithm to characterize and analyze different aspects of the bale.

In one aspect of the disclosure, the imaging device is positioned to capture the stereoscopic image outside the baling chamber. In another aspect of the disclosure, the imaging device is positioned to capture the stereoscopic image of the bale while the bale is still located inside the baling chamber.

In one aspect of the disclosure, the imaging device includes a stereo camera having at least two separate lenses, with each respective lens having a respective image sensor.

In one aspect of the disclosure, the processor is operable to execute the shape identification algorithm to associate a location of the bale after being discharged from the baling chamber with the stereoscopic image of the bale.

In one aspect of the disclosure, the processor is operable to execute the shape identification algorithm to adjust an operating parameter of the baling chamber or the wrap system based on the shape quality score.

In another aspect of the disclosure, the processor is operable to execute the shape identification algorithm to generate a point cloud representing the stereoscopic image and save the point cloud in the memory.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Referring to the Figures, wherein like numerals indicate like parts throughout the several views, A baler implement is generally shown at 20. The example embodiment of the baler implement 20 is configured as a round baler. However, it should be appreciated that the teachings of this disclosure may be applied to other configurations of the baler implement 20, such as but not limited to a large square baler, etc.

Figure 1:
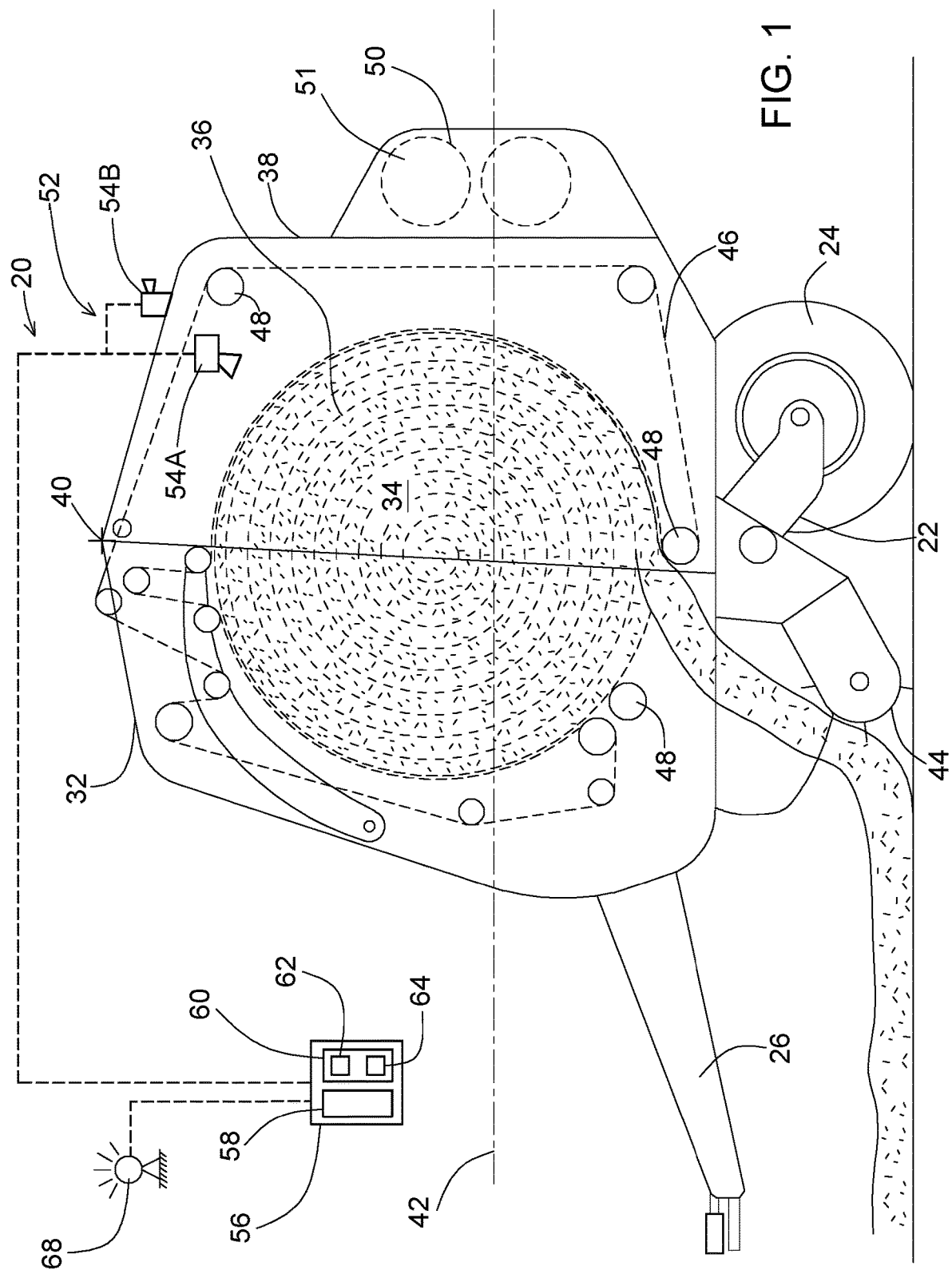
FIG. 1 is a schematic side view of a baler implement.

Referring to FIG. 1, the baler implement 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement may be included with the tongue 26. The hitch arrangement may be used to attach the baler implement 20 to a traction unit 30, such as but not limited to an agricultural tractor. In other embodiments, the baler implement 20 may be self-propelled, in which case the traction unit 30 and the baler implement 20 are configured as a single, self-propelled vehicle.

The baler implement 20 includes a housing 32 forming a baling chamber 34. The housing 32 is attached to and supported by the frame 22. The housing 32 may include, one or more walls or panels that at least partially enclose and/or define the baling chamber 34. The baling chamber 34 is operable to form crop material into a bale 36 having a defined shape. For the example embodiment, in which the baling implement is configured as a round baler, the defined shape is generally cylindrical. However, in other embodiments, the defined shape may differ from the example embodiment. For example, the defined shape may alternatively be a rectangular parallelepiped.

The baler implement 20 further includes a gate 38. The gate 38 is attached to and rotatably supported by the housing 32. The gate 38 is positioned adjacent a rearward end of the frame 22 and is pivotably moveable about a gate axis 40. The gate axis 40 is generally horizontal and perpendicular to a central longitudinal axis 42 of the frame 22. The gate 38 is moveable between a closed position for forming the bale 36 within the baling chamber 34, and an open position for discharging the bale 36 from the baling chamber 34.

The baler implement 20 may include, a pick-up 44 disposed proximate the forward end of the frame 22. The pickup gathers crop material from a ground surface and directs the gathered crop material toward and into an inlet of the baling chamber 34. The pickup may include, but is not limited to tines, forks, augers, conveyors, baffles, etc., for gathering and moving the crop material. The baler implement 20 may be equipped with a pre-cutter, disposed between the pickup and the inlet. As such, the pre-cutter is disposed downstream of the pickup and upstream of the inlet relative to a direction of travel of the crop material. The pre-cutter cuts or chops the crop material into smaller pieces.

As noted above, the example embodiment of the baler implement 20 is configured as a round baler. As is known by those skilled in the art, the round baler may be configured as a variable chamber baler, or as a fixed chamber baler. The round baler shown in the Figures and described herein is depicted and described as a variable chamber baler. However, it should be appreciated that the teachings of this disclosure may be applied to a fixed chamber baler. The variable chamber baler includes a plurality of longitudinally extending side-by-side forming belts 46 that are supported by a plurality of rollers 48. The bale 36 is formed by the forming belts 46 and one or more side walls of the housing 32.

The crop material is directed through the inlet and into the baling chamber 34, whereby the forming belts 46 roll the crop material in a spiral fashion into the bale 36 having a cylindrical shape. The belts apply a constant pressure to the crop material as the crop material is formed into the bale 36. A belt tensioner continuously moves the forming belts 46 radially outward relative to a center of the cylindrical bale 36 as the diameter of the bale 36 increases, The belt tensioner maintains the appropriate tension in the belts to obtain the desired density of the crop material.

The baler implement 20 may include a wrap system 50. The wrap system 50 is operable to wrap the bale 36 with a wrap material 51 inside the baling chamber 34. Once the bale 36 is formed to a desired size, the wrap system 50 feeds the wrap material 51 into the baling chamber 34 to wrap the bale 36 and thereby secure the crop material in a tight package and maintain the desired shape of the bale 36. The wrap material 51 may include, but is not limited to, a twine, a net mesh, or a solid plastic wrap. Movement of the gate 38 into the open position simultaneously moves the belts clear of the formed bale 36 and allows the formed and wrapped bale 36 to be discharged through the rear of the baling chamber 34.

The baler implement 20 further includes a bale monitoring system 52. The bale monitoring system 52 is operable to characterize, analyze, and/or assess a quality of the bale 36. The bale monitoring system 52 includes an imaging device 54A, 54B. The imaging device 54A, 54B is operable to capture a stereoscopic image of the bale 36. As is understood by those skilled in the art, the term "stereoscopic" is commonly understood to relate to or denote a process by which two images of the same object are taken at slightly different angles and when viewed together create an impression of depth and solidity, such as occurs with binocular vision. As such, it should be appreciated that a stereoscopic image includes an image that is generated from two or more other images of the same object that are taken at slightly different angles and combined to define the stereoscopic image that provides a depth dimension. A stereoscopic image is commonly referred to as a three-dimensional image.

The imaging device 54A, 54B may include any device or system of components that is capable of generating the stereoscopic image of the bale 36. For example, the imaging device 54A, 54B may include, but is not limited to, a stereo camera or other similar device. As is understood by those in the art, the stereo camera includes at least two separate lenses, with each respective lens having a respective image sensor. The respective image sensor's capture an image of the same object from different view points or angles, thereby providing the two or more images necessary to generate the stereoscopic image. Alternatively, it should be appreciated that the imaging device 54A, 54B may include multiple single lens sensors that cooperate together to capture the two or more images of the bale 36 from different view points, and which are combined to define the stereoscopic image of the bale 36.

The imaging device 54A, 54B may capture the stereoscopic image using a suitable light spectrum. The light spectrum may include a visible light spectrum, a non-visible light spectrum, or a combination thereof.

The imaging device 54A, 54B may be positioned to capture the stereoscopic image of the bale 36 when the bale 36 is located outside the baling chamber 34. Alternatively, the imaging device 54A, 54B may be positioned to capture the stereoscopic image of the bale 36 when the bale 36 is located inside the baling chamber 34. In another alternative implementation, the baler implement 20 may include a first imaging device 54A operable to capture a first stereoscopic image of the bale 36 while the bale 36 is located inside the baling chamber 34, and a second imaging device 54B operable to capture a second stereoscopic image of the bale 36 when the bale 36 is located outside the baling chamber 34.

The bale monitoring system 52 further includes a computing device 56. The computing device 56 is disposed in communication with the imaging device 54A, 54B for receiving data related to the stereoscopic image and/or the stereoscopic image of the bale 36. The computing device 56 may alternatively be referred to as a controller, a computer, a module, a control module, a control unit, etc. The computing device 56 is operable to control the operation of the bale monitoring system 52. The computing device 56 includes a processor 58, a memory 60, and all software, hardware, algorithms, connections, sensors, etc., necessary to manage and control the operation of the bale monitoring system 52. As such, a method may be embodied as a program or algorithm operable on the computing device 56. It should be appreciated that the computing device 56 may include any device capable of analyzing data from various sensors, receiving data from the imaging device 54A, 54B, comparing data, making the necessary decisions required to control the operation of the bale monitoring system 52 and/or the baler implement 20, and executing the required tasks necessary to control the operation of the baler implement 20.

The computing device 56 may be embodied as one or multiple digital computers or host machines each having one or more processor 58s, read only memory 60 (ROM), random access memory 60 (RAM), electrically-programmable read only memory 60 (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 60 may include any non-transitory/tangible medium which participates in providing data or computer-readable instructions. Memory 60 may be non-volatile or volatile. Non-volatile media may include, for example, optical or magnetic disks and other persistent memory 60. Example volatile media may include dynamic random access memory 60 (DRAM), which may constitute a main memory 60. Other examples of embodiments for memory 60 include a floppy, flexible disk, or hard disk, magnetic tape or other magnetic medium, a CD-ROM, DVD, and/or any other optical medium, as well as other possible memory 60 devices such as flash memory 60.

The computing device 56 includes the tangible, non-transitory memory 60 on which are recorded computer-executable instructions, including a shape identification algorithm 62. The processor 58 of the computing device 56 is configured for executing the shape identification algorithm 62. The shape identification algorithm 62 implements a method of characterizing and/or assessing a quality of the bale 36, and controlling the baler implement 20 based on the quality of the bale 36.

As noted above, the imaging device 54A, 54B captures the stereoscopic image, or otherwise captures multiple images or data that are then communicated to the computing device 56, which may then combine the images and/or data to define the stereoscopic image of the bale 36. The computing device 56 may then generate a point cloud representing the stereoscopic image and save the point cloud in the memory 60. As understood by those skilled in the art, a point cloud includes a set of three-dimensional data points, which may define an exterior surface of an object, e.g., the bale 36. The point cloud may be used to analyze and/or render the bale 36.

Figure 2:
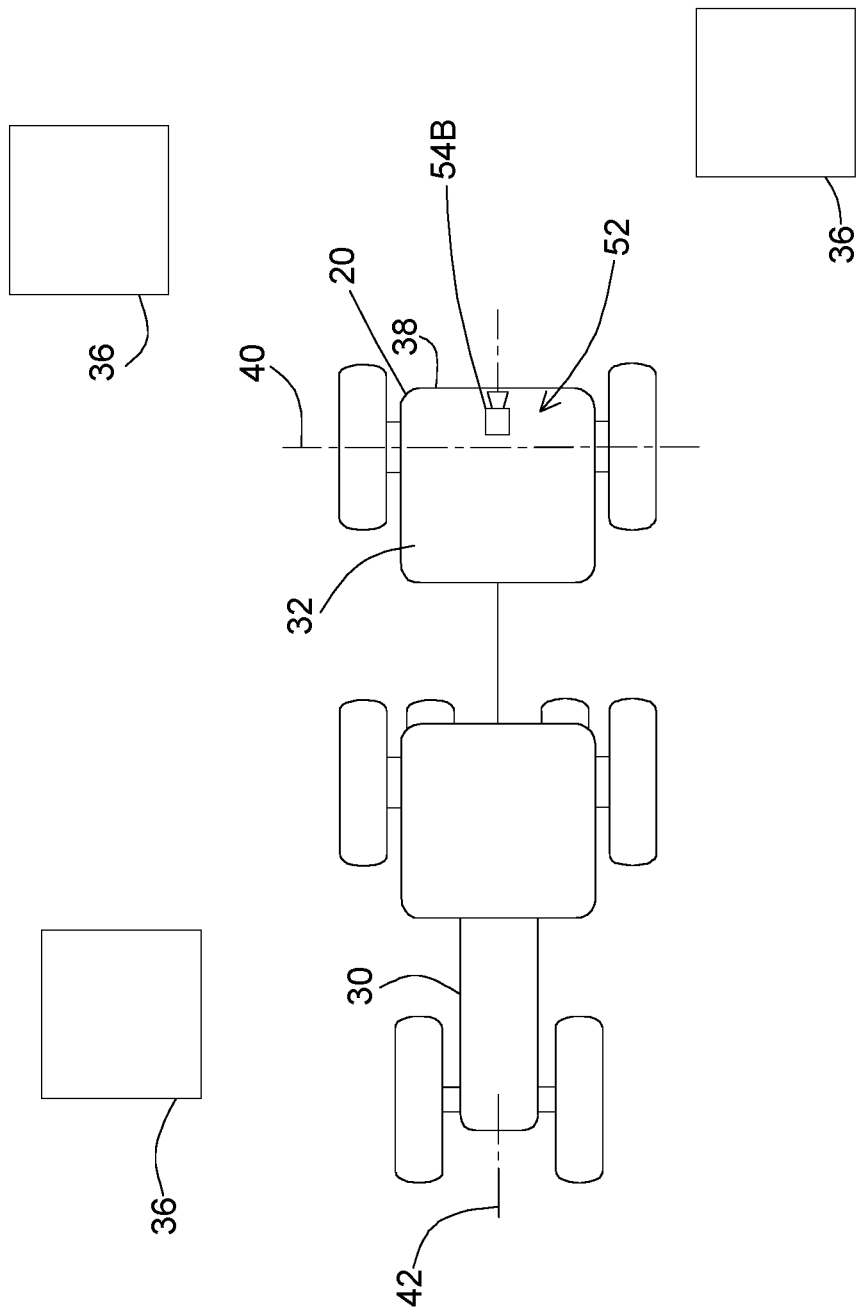
FIG. 2 is a schematic plan view showing the baler implement in a field.

Referring to FIG. 2, the computing device 56 may associate a location of the bale 36 with the stereoscopic image of the bale 36. The computing device 56 may determine the location of the bale 36 in any suitable manner. For example, the baler implement 20 may be equipped with a Global Positioning Satellite (GPS) system that is operable to determine a geographic location. If the stereoscopic image of the bale 36 is obtained while the bale 36 is located within the baling chamber 34, then the location of the baler implement 20 at the time the bale 36 is discharged from the baling chamber 34 may be used to define the location of the bale 36. The location of the baler implement 20, obtained from the GPS system, may be corrected to provide a more accurate location of the bale 36 using the stereoscopic image. The stereoscopic image may be used in conjunction with the GPS location of the baler implement 20 to provide a highly accurate bale location and orientation, particularly when the bale 36 moves after being discharged from the baler implement 20. By using the GPS location and translating the location of the bale 36, based on the distance and location recorded from the stereoscopic image in reference to a set point on the baler implement 20, the accuracy of the bale location may be improved. The computing device 56 may obtain the location of the baler implement 20 from the GPS system. Alternatively, the computing device 56 may use the location of the baler implement 20, with data from other sensors, such as but not limited to one or more position and/or distance sensors, to calculate the location of the bale 36. The location of the bale 36 on the field, along with the stereoscopic image of the bale 36, may be associated together and saved in the memory 60 for use in other operations.

Figure 3:
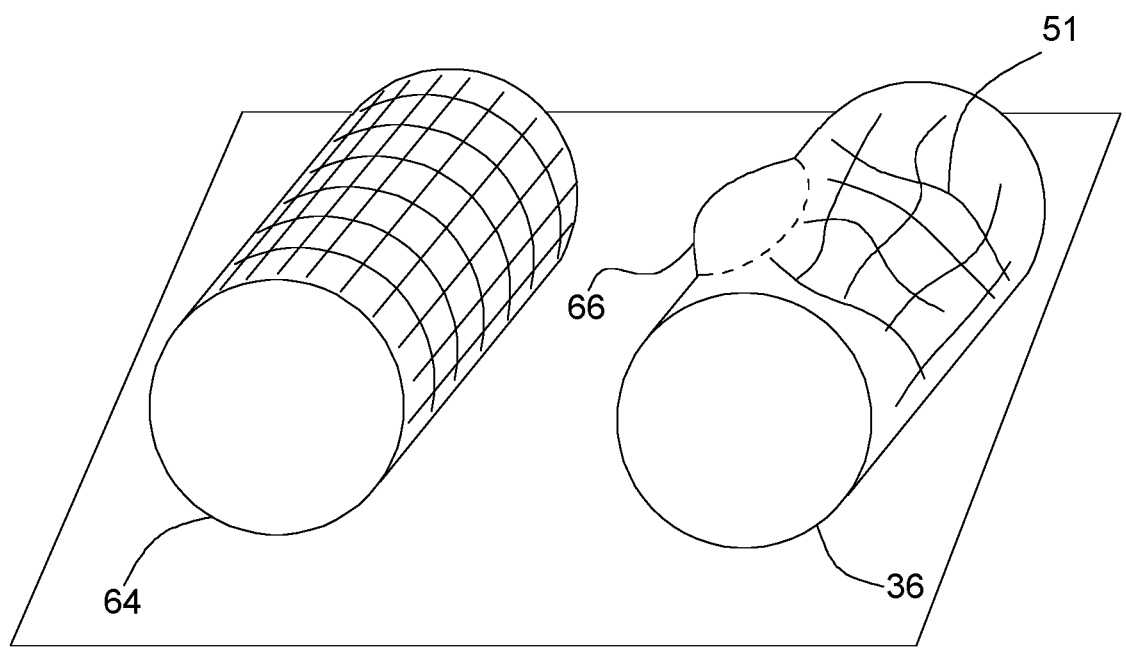
FIG. 3 is a schematic perspective view showing a stereoscopic image of a bale compared to a three-dimensional standard of the bale.

Referring to FIG. 3, the computing device 56 may compare the stereoscopic image of the bale 36, and/or the point cloud of the bale 36, to a three-dimensional standard 64. The three-dimensional standard 64 of the bale 36 defines a target three-dimensional shape to which the shape of the bale 36 may be compared. The three-dimensional standard 64 may be considered an ideal shape of the bale 36, and deviation from the three-dimensional standard 64 may indicate one or more problems or improper settings with the baler implement 20. The ideal shape of the bale 36 may be based upon, but is not limited to, a desired diameter, a desired bale shape profile, a desired wrapping sequence, a desired cut type, etc. The computing device 56 compares the stereoscopic image of the bale 36 obtained from the imaging device 54A, 54B to the three-dimensional shape to identify a deviation of the bale 36 from the three-dimensional standard 64.

It should be appreciated that some variation between the stereoscopic image and the three-dimensional standard 64 will exist, and that the deviation is a measure of the difference between the stereoscopic image and the three-dimensional standard 64 that is greater than an allowable variation or range of deviation. As such, if the stereoscopic image of the bale 36 differs from the three-dimensional standard 64 by only a slight variation, that is within the allowable range of variation, then the computing device 56 may determine that the stereoscopic image does not deviate from the three-dimensional standard 64. However, if the stereoscopic image of the bale 36 differs from the three-dimensional standard 64 by an amount that is greater than the allowable range of variation, then the computing device 56 may determine that the stereoscopic image of the bale 36 does deviate from the three-dimensional standard 64.

The deviation of the bale 36 may indicate a problem with the bale 36 and/or the baler implement 20. For example, the computing device 56 may determine if the wrap material 51 disposed around the circumference of the bale 36 is broken or is unbroken based on the comparison of the stereoscopic image of the bale 36 to the three-dimensional standard 64. When the stereoscopic image of the bale 36 does not deviate from the three-dimensional standard 64, the computing device 56 may determine that the wrap material 51 has been properly installed and is intact. In contrast, a regional bulge 66 outward from the three-dimensional standard 64 may indicate that the wrap material 51 is broken or was not installed properly. The computing device 56 may determine the status of the wrap material 51, i.e., broken or unbroken, in some other manner than described herein. For example, the computing device 56 may analyze color data along with a point cloud. The color data may be analyzed based on location within the point cloud to determine if the wrap material has been properly applied to the bale 36. For example, a region with no wrap material may include or exhibit a different color than regions of the bale 36 that are covered by the wrap material. The different color in an isolated region may be the basis for determining the status of the wrap material.

The computing device 56 may further assign the bale 36 a shape quality score based on the comparison of the stereoscopic image of the bale 36 to the three-dimensional standard 64. In one implementation, the shape quality score may indicate a magnitude of the deviation of the bale 36 from the three-dimensional standard 64. For example, the larger the difference between the shape of the bale 36 as captured in the stereoscopic image and the three-dimensional standard 64, the larger the deviation and therefore the larger the shape quality score. In other implementations, the shape quality score may indicate one of a plurality of different shape characteristics. For example, a first bale 36 shape may have a first shape quality score, whereas a second bale 36 shape may have a second shape quality score.

Based on the shape quality score, the computing device 56 may then activate an alert system 68. The alert system 68 may include a system capable of notifying an operator. For example, the alert system 68 may include a visual light, an audible alarm, a text message displayed on a screen, etc. As noted above, the deviation and/or the shape quality score may indicate a particular shape of the bale 36, or a particular problem with the bale 36. For example, the deviation and the shape quality score may indicate that the wrap material 51 is broken. In response thereto, the computing device 56 may signal or activate the alarm to notify the operator of a potential issue or problem with the baler implement 20.

In one implementation of the disclosure, based on the shape quality score, the computing device 56 may determine an adjustment for and operating parameter of the baler implement 20. Additionally, the computing device 56 may adjust the operating parameter of the baler implement 20. The operating parameter of the baler implement 20 may include, but is not limited to, the operation of the baling chamber 34, the operation of the wrap system 50, the operation of the pickup, the discharge of the bale 36 from the bailing chamber, or some other operation of the baler implement 20 whether described herein or not. For example, the tension of the forming belts 46 may be adjusted, a diameter of the bale 36 may be adjusted, a pre-cutter length may be adjusted, etc. In one implementation, the computing device 56 may adjust the operating parameter of the baler implement 20 automatically based on the shape quality score. In another implementation, the computing device 56 may provide a recommended adjustment for the baler implement 20 to the operator, and allow the operator to accept or decline the recommended adjustment to the baler implement 20.

The computing device 56 may further use the stereoscopic image and/or the point cloud from the stereoscopic image to calculate a volume of the bale 36. The computing device 56 may then divide a weight of the bale 36 by the volume to calculate a bale 36 density. Because of the three-dimensional data included in the stereoscopic image, the computing device 56 may determine the volume of the bale 36 from the stereoscopic image. The weight of the bale 36 may be calculated, determined, or sensed in a suitable manner understood by those skilled in the art.

The computing device 56 may further communicate the shape quality score to a bale 36 management system and/or algorithm. The bale 36 management system may include a software package that tracks and manages data related to specific bale 36s. For example, the bale 36 management system may track a location of a specific bale 36 on the field, a moisture content of the bale 36, a weight of the bale 36, etc. The bale 36 management system may be located remotely from the baler implement 20. For example, the bale 36 management system may be located on a tractor used to pull the baler implement 20, or in other implementations, may be located at some other remote location. In yet other implementations, the bale 36 management system may be cloud based data management system. The computing device 56 may communicate the stereoscopic image and/or the shape quality score to the bale 36 management system. Additionally, the computing device 56 may communicate other data or characteristic of the bale 36 derived from the stereoscopic image of the bale 36, e.g., the volume of the bale 36, etc.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A bale monitoring system for characterizing and assessing a quality of a bale, the bale monitoring system comprising:
   an imaging device operable to capture a stereoscopic image of the bale;
   a computing device in communication with the imaging device for receiving the stereoscopic image of the bale, the computing device including a processor and a memory having a shape identification algorithm stored thereon, wherein the processor is operable to execute the shape identification algorithm to:
   compare the stereoscopic image of the bale to a three-dimensional standard to identify a deviation of the bale from the three-dimensional standard;
   assign the bale a shape quality score based on the comparison of the stereoscopic image of the bale to the three-dimensional standard, wherein the shape quality score indicates a magnitude of the deviation of the bale from the three-dimensional standard.

2. The bale monitoring system set forth in claim 1, wherein the imaging device includes a stereo camera having at least two separate lenses, with each respective lens having a respective image sensor.

3. The bale monitoring system set forth in claim 1, wherein the imaging device is positioned to capture the stereoscopic image of the bale outside of a baling chamber of a baler implement.

4. The bale monitoring system set forth in claim 1, wherein the processor is operable to execute the shape identification algorithm to determine an adjustment for a baler implement based on the shape quality score.

5. The bale monitoring system set forth in claim 1, wherein the processor is operable to execute the shape identification algorithm to generate a point cloud representing the stereoscopic image and save the point cloud in the memory.

6. The bale monitoring system set forth in claim 1, wherein the processor is operable to execute the shape identification algorithm to calculate a volume of the bale from the stereoscopic image of the bale.

7. The bale monitoring system set forth in claim 1, wherein the processor is operable to execute the shape identification algorithm to determine if a bale wrap disposed around a circumference of the bale is broken or is unbroken based on the comparison of the stereoscopic image of the bale to the three-dimensional standard.

8. The bale monitoring system set forth in claim 1, wherein the processor is operable to execute the shape identification algorithm to communicate the shape quality score to a bale management algorithm.

9. The bale monitoring system set forth in claim 1, wherein the processor is operable to execute the shape identification algorithm to associate a location of the bale with the stereoscopic image of the bale.

10. The bale monitoring system set forth in claim 1, wherein the imaging device is mounted on a baler implement.

11. A baler implement comprising:
    a baling chamber operable to form crop material into a bale having a defined shape;
    a wrap system operable to wrap the bale with a wrap material to secure the crop material in the defined shape;
    an imaging device operable to capture a stereoscopic image of the bale; and
    a computing device in communication with the imaging device for receiving the stereoscopic image of the bale, the computing device including a processor and a memory having shape identification algorithm stored thereon, wherein the processor is operable to execute the shape identification algorithm to:
    compare the stereoscopic image of the bale to a three-dimensional standard to identify a deviation of the bale from the three-dimensional standard indicating the wrap material is broken;
    activate an alert system when the deviation indicates that the wrap material is broken; and
    assign the bale a shape quality score based on the comparison of the stereoscopic image of the bale to the three-dimensional standard, whereby the shape quality score indicates a magnitude of the deviation of the bale from the three-dimensional standard.

12. The baler implement set forth in claim 11, wherein the imaging device is positioned to capture the stereoscopic image outside the baling chamber.

13. The baler implement set forth in claim 11, wherein the imaging device includes a stereo camera having at least two separate lenses, with each respective lens having a respective image sensor.

14. The baler implement set forth in claim 11, wherein the processor is operable to execute the shape identification algorithm to associate a location of the bale with the stereoscopic image of the bale.

15. The baler implement set forth in claim 11, wherein the processor is operable to execute the shape identification algorithm to adjust an operating parameter of the baling chamber or the wrap system based on the shape quality score.

16. The baler implement set forth in claim 11, wherein the processor is operable to execute the shape identification algorithm to generate a point cloud representing the stereoscopic image and save the point cloud in the memory.

\* \* \* \* \*